United States Patent [19]

Christe et al.

[11] 3,873,677
[45] Mar. 25, 1975

[54] IODINE PERCHLORATES
[75] Inventors: Karl O. Christe, Calabasas; Carl J. Schack, Chatsworth, both of Calif.
[73] Assignee: The United States of America as represented by the Secretary of the Navy, Washington, D.C.
[22] Filed: May 24, 1973
[21] Appl. No.: 363,708

[52] U.S. Cl. ............... 423/466, 423/179, 423/462, 423/472, 423/504
[51] Int. Cl. ...... C01d 11/04, C01b 7/00, C01b 7/24
[58] Field of Search .......... 423/466, 462, 179, 475, 423/504

[56] References Cited
UNITED STATES PATENTS
3,694,172   9/1972   Schack et al. .................. 423/466

Primary Examiner—Edward Stern
Attorney, Agent, or Firm—R. S. Sciascia; J. A. Cooke

[57] ABSTRACT

Iodine perchlorates of the formula $X(OClO_3)_n$ wherein X is selected from the group consisting of $I^{+++}$ and $CsI^{++}$, wherein $n$ equals 3 when X is $I^{+++}$ and $n$ equals 4 when X is $CsI^{+4}$, are prepared by reacting $ClOClO_3$ with either solid I or CsI at low temperatures. The iodine perchlorates are useful as energetic oxidizers.

5 Claims, No Drawings

IODINE PERCHLORATES

BACKGROUND OF THE INVENTION

This invention generally relates to perchlorate compounds and more particularly to iodine perchlorates.

The alleged preparation of iodine trisperchlorate from iodine, ozone, and anhydrous $HClO_4$ is described by M. Schmeisser in "Handbook of Preparative Inorganic Chemistry," G. Brauer, Ed., Academic Press, New York, N. Y. 1963, Vol. 1, pg. 330. However, a crosscheck with the original publication, F. Fichter and H. Kappeler, Z. Anorg. Allgem. Chem., 91, 134 (1915), reveals that the original paper deals only with a compound having the empirical composition, $I(ClO_4)_3 \cdot 2H_2O$. Further, from the properties of $I(OClO_3)_3$, it appears unlikely that the Fichter, et al., compound was the bishydrate of $I(OClO_3)_3$.

The bishydrate of iodine trisperchlorate, $I(OClO_3)_3 \cdot 2H_2O$, should be a less energetic oxidizer than the anhydrous form, and therefore would be less suitable for propellants. In view of this attempts have been made to obtain the bishydrate as well as the anhydrous material.

SUMMARY OF THE INVENTION

Accordingly, one object of this invention is to provide iodine perchlorates.

Another object of this invention is to isolate iodine perchlorates in this solid anhydrous form.

A further object of this invention is to provide iodine perchlorates which are highly energetic oxidizers.

A still further object of this invention is to provide a method of synthesizing iodine perchlorates.

Still another object of this invention is to achieve a high degree of purity in the iodine perchlorates synthesized.

Yet another is to provide a easy means for purifying the iodine perchlorates.

These and other objects of this invention are accomplished by providing compounds which are iodine perchlorates of the formula $X(OClO_3)_n$, wherein X is selected from the group consisting of $I^{+++}$ and $CsI^{+4}$ wherein $n$ equals 3 when X is $I^{+++}$, and $n$ equals 4 when X is $CsI^{+4}$. The iodine perchlorates are prepared by reacting chlorine perchlorate, $ClOClO_3$, with a substance selected from the group consisting of $I_2$ and CsI at low temperatures.

DESCRIPTION OF THE PREFERRED EMBODIMENT

The iodine perchlorates of this invention are prepared by reacting chlorine perchlorate, $ClOClO_3$, with either iodine, $I_2$, or CsI. The reaction for preparing iodine trisperchlorate is as follows:

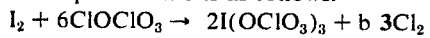

and the reaction for preparing the cesium tetraperchlorato iodate is as follows:

The range of suitable reaction temperatures is limited by the slow reaction rates and the instability of the iodine perchlorate products. For examle, the iodine trisperchlorate reaction takes 70 hours at −50°C and the cesium tetrapherchlorato iodate reaction takes 5 weeks at 31 45°C to go to 99 percent completion and at lower temperatures the reaction takes still longer. On the other hand, while the $CsI(OClO_3)_4$ is stable at 23°C, iodine trisperchlorate rapidly decomposes, at this temperature.

Thus, the reaction temperature for producing $CsI(OClO_3)_4$ should be in the range −78° to 30°C, preferably −55° to −40°C; and the reaction temperature for producing iodine trisperschlorate should be in the range −78° to 0°C, preferably −55° to −40°C.

Purification of the product is simplified by reacting a stoichiometric excess of chlorine perchlorate with iodine or cesium iodide in an inert environment. The excess of chlorine perchlorate is used to drive the reaction to 99 percent completion. The the solid $I(OClO_3)_3$ or $CsI(OClO_3)_4$ product can be separated from the by-product chlorine and unreacted chlorine perchlorate at low temperatures under vacuum. Finally, since water is neither a reactant nor a product in either of the reactions, the anhydrous form of $I(OClO_3)_3$ or $CsI(OClO_3)_4$ is obtained when the reaction is run in an anhydrous environment. Additionally, because of the reactivity of the desired perchlorates it is most desirable to conduct the reactions in an inert environment which, within the context of this invention, is meant to include anhydrous conditions.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

Iodine Trisperchlorate

Iodine (0.915 mmol) was loaded into a 10 ml prepassivated Teflon FEP ampoule closed off by a stainless steel valve. Chlorine perchlorate (8.18 mmol) was added at −196°C. The ampoule was kept at −50°C for 70 hours. At this point, the dark iodine color had disappeared and a pale yellow (due to the presence of $Cl_2$) solid had formed. Upon cooling to −196°C, the ampoule did not contain any non-condensible reaction products. The ampoule was slowly warmed to −45°C. The volatile products were separated by fractional condensation and identified by infrared spectroscopy and their vapor pressure. They consisted of $Cl_2$ (2.70 mmol) and $ClOClO_3$ (2.74 mmol). The white, solid residue weighed 776 mg., in excellent agreement with the weight (777 mg) calculated for a complete conversion to $I(OClO_3)_3$.

EXAMPLE 2

Cesium Tetraperchlorato Iodate (III)

A 10 ml prepassivated stainless steel cylinder was loaded with powdered anhydrous CsI (1.15 mmol), followed by $ClOClO_3$ (6.10 mmol) at b −196°C. The reaction was allowed to proceed by warming the cylinder to −45°C, where it was maintained for 5 weeks. On re-cooling to −196°C, no non-condensible gases were observed. Volatile products were pumped from the reactor for several hours while and after it had warmed to ambient temperature. Separation of these species was affected by fractional condensation and identification by infrared and vapor pressure measurements. They consisted of $Cl_2$ (2.34 mmol) and unreacted $ClOClO_3$ (1.45 mmol). The solid product was pale yellow in color and weighed 749 mg, indicating a 99 percent conversion of the CsI to $Cs^+I(OClO_3)_4^-$ had occurred.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A method of preparing cesium tetraperchlorato iodate (III), $CsI(OClO_3)_4$, comprising:
contacting chlorine perchlorate and cesium iodide in an inert environment at a temperature in the range of −78°C to 30°C for 70 or more hours, provided that at least 4 moles of chlorine perchlorate are used per mole of cesium iodide.

2. The method of claim 1 wherein said contacting is performed at a temperature of −55°C to −40°C.

3. The method of claim 1, wherein more than 4 moles of said chlorine perchlorate is used per mole of cesium iodide.

4. Cesium tetraperchlorato iodate (III), $CsI(OCl_3)_4$, as produced by the process of claim 1.

5. The product of claim 4, wherein the said iodate compound is anhydrous.

* * * * *